United States Patent
Petri

(10) Patent No.: US 8,918,437 B2
(45) Date of Patent: Dec. 23, 2014

(54) FRAGMENT RECONSTITUTION IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 1975 days.

(21) Appl. No.: 11/778,791

(22) Filed: Jul. 17, 2007

(65) Prior Publication Data

US 2009/0024670 A1 Jan. 22, 2009

(51) Int. Cl.
*G06F 7/00* (2006.01)
*G06F 17/30* (2006.01)

(52) U.S. Cl.
CPC .................. *G06F 17/30011* (2013.01)
USPC .......................................... 707/821; 707/829

(58) Field of Classification Search
CPC .......... G06F 17/30011; G06F 11/1458; G06F 11/1461; G06F 3/0605; G06F 3/0607
USPC ................... 707/821–822, 828–829
See application file for complete search history.

(56) References Cited

U.S. PATENT DOCUMENTS

| | | | |
|---|---|---|---|
| 6,594,692 B1 * | 7/2003 | Reisman | 709/219 |
| 7,139,973 B1 * | 11/2006 | Kirkwood et al. | 715/206 |
| 7,275,079 B2 * | 9/2007 | Brodsky et al. | 709/203 |
| 7,487,138 B2 * | 2/2009 | Borthakur et al. | 707/2 |
| 2003/0033287 A1 * | 2/2003 | Shanahan et al. | 707/3 |
| 2006/0015904 A1 * | 1/2006 | Marcus | 725/46 |
| 2006/0203849 A1 * | 9/2006 | Bonar et al. | 370/473 |
| 2006/0259949 A1 * | 11/2006 | Schaefer et al. | 726/1 |
| 2007/0192338 A1 * | 8/2007 | Maier et al. | 707/100 |

OTHER PUBLICATIONS

Documentum, "XML Application Development Guide", Version 5.2.5, Mar. 2004, pp. 42-43.
Eric Severson, Whitepaper, "Integrating XML Publishing with a Content Management System: Best Practices", 2003 Flatirons Solutions Corporation.

* cited by examiner

*Primary Examiner* — James Trujillo
*Assistant Examiner* — Linh Black
(74) *Attorney, Agent, or Firm* — Patterson & Sheridan LLP

(57) ABSTRACT

A method and apparatus for improving the performance of a CMS system configured for bursting is disclosed. The CMS may be configured to automatically scan the CMS for unused document fragments and "clean up" the repository by reinserting the unused document fragments back into a corresponding source document. Thus, embodiments of the invention do not rely on beforehand knowledge and policy setting as current approaches. Rather, an autonomous method is used to manage document fragments by detecting and reinserting unused fragments back into their original documents.

24 Claims, 6 Drawing Sheets

| POLICY BINDING ID | TIME BEFORE REBURSTING | MINIMUM REFERENCE COUNT | MINIMUM PEER REUSE | TIME BEFORE REBURSTING |
|---|---|---|---|---|
| POLICY 1 (BOUND TO FRAGMENT 23879901 AND 20938579) | (1.5 WEEKS) | 4 | 0% | (2.5 WEEKS) |
| POLICY 2 (BOUND TO FRAGMENT 49899828, 59283994, AND 42539298) | (1.5 WEEKS) | 1 | 50% | (2.5 WEEKS) |

FIG. 4

| SCAN FREQUENCY | SCAN DAY | SCAN TIME | DETECTION POLICY |
|---|---|---|---|
| WEEKLY | MONDAY | 12:00 AM | AUTOMATIC_REINSERTION |

FIG. 5

FRAGMENT RECONSTITUTION IN A CONTENT MANAGEMENT SYSTEM

BACKGROUND OF THE INVENTION

1. Field of the Invention

Embodiments of the invention are generally related to managing a collection of data objects in a content management system. More specifically, embodiments of the invention are related to reassembling fragmented objects in a content management system.

2. Description of the Related Art

Content management systems (CMS) allow multiple users to share information. Generally, a CMS allows users to create, modify, archive, search, and remove data objects from an organized repository. The data objects managed by a CMS may include text documents, spreadsheets, database records, digital images, and digital video sequences, to name but a few (generically referred to as documents). A CMS typically includes tools for document publishing, format management, revision and/or access control, along with tools for document indexing, searching, and retrieval.

Some CMS systems use XML (extensible markup language) to manage content stored in the CMS repository. An XML-aware CMS may provide users with a variety of advantages, for example:

structured authoring—the ability to incorporate metadata that is normally lost in conventional formats repurposing of data—the ability to share fragments of data or to transform the data into different formats publishing—the ability to have "single source publishing" using XMLstylesheets (e.g. XSLT) that separate content from presentation interoperability—the ability to utilize XML data across different systems or applications intelligent storage—the ability to synchronize XML content with attributes in the CMS Thus, an XML aware CMS can manage XML content in powerful ways. Because of these, and other advantages, XML is growing in popularity as the preferred format for authoring, publishing, and storing a variety documents and/or multimedia content.

One useful content management technique for processing documents with XML is referred to as "bursting" or "chunking." Bursting is the process of breaking apart an XML document into smaller chunks, where each chunk can be managed as its own object in the CMS (each object can have its own access control list (ACL), lifecycles, etc.). When a user edits a document file that has been burst, the CMS assembles the various chunks so that the complete XML document appears to the user as a single unit again. This feature is very useful for sharing and reusing XML content during authoring.

A CMS may be configured to burst documents of a given type using configuration rules. The configuration rules drive the processing of XML content whenever it flows into or out of the repository. For example, the configuration rules may specify that whenever documents of a particular type are imported or checked-in to the CMS, specified elements may be burst from that document into individual fragments. Further, such fragments should be managed internally by the CMS as separate documents. However, great care must be taken by the system administrator when defining the bursting rules applied to a given document or document type. If XML content is chunked at too low a level, then there may be an overabundance of fragments stored in the CMS. If there are too many unused fragments, it can adversely impact overall system performance.

Generally, the appropriate level of bursting for a particular type of document depends on particular manageability and reuse requirements present in an individual case. Smaller chunks may increase the opportunity for fragment reuse, but may also lead to slower performance when users work with documents.

On one hand, it can be useful to allow a system administrator to control the system's bursting policy (e.g. it takes the burden off of authors), making it a seamless process for authors to share the information they create. Or in some cases, an organization may have a well-defined reuse philosophy. On the other hand, configuring a bursting policy up-front may cause unwanted maintenance and performance problems down the road. Frequently, the system administrator ends up creating many unused fragments simply because the authors' reuse patterns (e.g. frequency of document fragment reuse) are difficult to predict.

Accordingly, for all the foregoing reasons, there remains a need in the art for a CMS document management system which permits fragment reuse without creating so many unused fragments that CMS system performance is degraded.

SUMMARY OF THE INVENTION

One embodiment of the invention includes a computer-implemented method of fragment reconstitution in a content management system (CMS). The method generally includes scanning a plurality of document fragments stored by the CMS. Each of the plurality of document fragments may have been burst from a corresponding source document, and each of the plurality of document fragments may be associated with a reconstitution policy. The method also includes reinserting at least one of the document fragments into the respective source document corresponding to the at least one document fragment, based on the respective reconstitution policy associated with the at least one document fragment, thereby producing an at least partially reconstituted source document. The method also includes storing the partially reconstituted source document on a computer readable medium.

Another embodiment of the invention includes a computer-readable storage medium containing a program which, when executed, performs an operation for fragment reconstitution in a content management system (CMS). The operation generally includes scanning a plurality of document fragments stored by the CMS. Each of the plurality of document fragments was burst from a corresponding source document and each of the plurality of document fragments is associated with a reconstitution policy. The operation also includes reinserting at least one of the document fragments into the respective source document corresponding to the at least one document fragment, based on the respective reconstitution policy associated with the at least one document fragment, thereby producing an at least partially reconstituted source document. And the operation also includes storing the partially reconstituted source document on a computer readable medium.

Still another embodiment of the invention includes a system having a processor and a memory containing a content management system (CMS) program which, when executed by the processor, performs an operation for fragment reconstitution in the CMS. The operation may generally include scanning a plurality of document fragments stored by the CMS. Each of the plurality of document fragments was burst from a corresponding source document and may be associated with a reconstitution policy. The operation also includes Reinserting at least one of the document fragments into the respective source document corresponding to the at least one document fragment, based on the respective reconstitution policy associated with the at least one document fragment, thereby producing an at least partially reconstituted source document. The operation also includes storing the partially reconstituted source document on a computer readable medium.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 4-5 illustrate an example of a fragment reconstitution policies used by a CMS to manage document fragments, according to one embodiment of the invention.

DETAILED DESCRIPTION OF THE PREFERRED EMBODIMENTS

Figure 1:
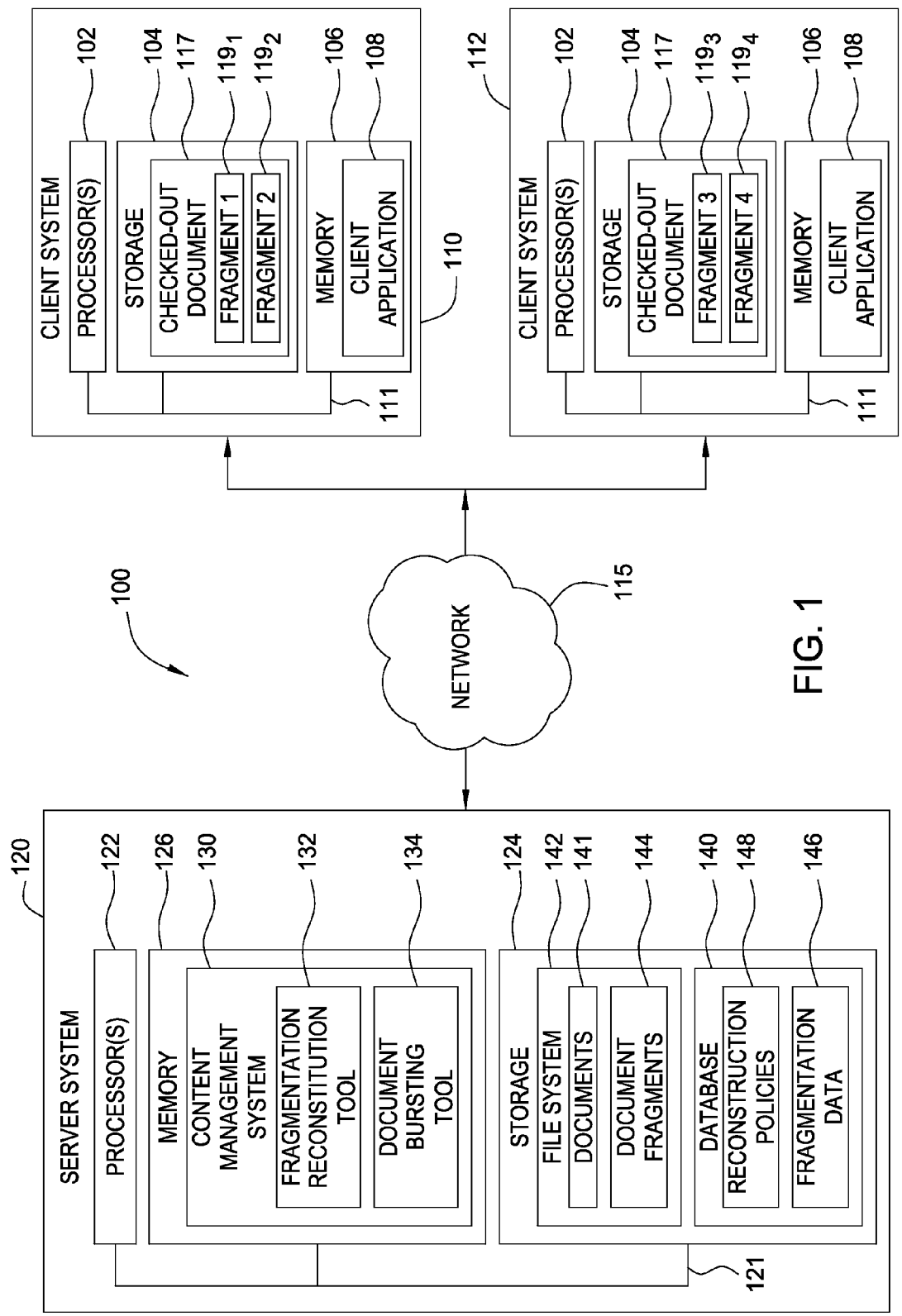
FIG. 1 is a block diagram illustrating a computing environment and content management system (CMS), according to one embodiment of the invention.

Embodiments of the invention provide a content management system (CMS) configured to detect unused document chunks (e.g., fragments of an XML document) and reinsert them into their original source document (or documents) within the repository maintained by the CMS. In one embodiment, fragment reconstitution policies specify when a given document fragment is available for reinsertion. For example, reconstitution policies may specify how long an XML fragment must exist within the system before it is available for reinsertion or how many references to the XML fragment must exist for it to remain as a burst fragment within the CMS.

Once an XML fragment has been reinserted, the reconstitution policies may specify how long that fragment should remain within its source document before being eligible for bursting again. When an XML fragment is added to the CMS (i.e. during a bursting operation), a reconstitution policy is bound to the fragment object (e.g. via a CMS relation object). This binding may be set up on a per document type basis—so that all fragments of a particular document type can use the same reconstitution policy. The CMS may run a background process to detect and potentially reinsert unused XML fragments.

The performance of a CMS system configured for bursting may be significantly improved by automatically scanning the CMS for unused fragments and "cleaning up" the repository when certain conditions are met (e.g. if fragment A has been in the system for X number of days and is not referenced by more than one document, then the system should reinsert the fragment into its original source document). Thus, embodiments of the invention do not rely so heavily on beforehand knowledge and policy setting as current approaches. Rather, an autonomous method is provided for managing fragments by detecting and reinserting unused fragments back into their original documents. Overtime, as the CMS identifies unused fragments (based on the reconstitution policies), the unused fragments are automatically reinserted back into their source documents.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Additionally, embodiments of the invention are described herein adapted for use with the widely used XML markup language. Accordingly, references to data objects, documents, and XML documents generally refers to data marked up using a well-formed collection of XML tags, elements and/or attributes. As is known, an XML document may be used to describe virtually any type of data. For example, XML grammars have been used to describe word processing documents, spreadsheets, database records, digital images and digital video, to name but a few. Further, specialized grammars are frequently specified by a domain specific XML schema. A given XML document may also be associated with additional artifacts such as a document type definition (DTD), XSLT transforms, XSL style sheets, and other associated files, tools, and utilities. However, the invention is not limited to the XML markup language, XML schemas, and the use of XML documents; rather, embodiments of the invention may be adapted to other markup languages or other data object formats or data representations, whether now known or later developed.

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client/server view of a computing environment 100, according to one embodiment of the invention. As shown, computing environment 100 includes two client computer systems 110 and 112 communicating with a server system 120 over a network 115. The computer systems 110, 112, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer systems 110, 112, and 120 are simplified to highlight aspects of the present invention and that computing systems and networks typically include a variety of additional elements not shown in FIG. 1.

As shown, client computer systems 110 and 112 each include a CPU 102, storage 104, and memory 106 connected by a bus 111. CPU 102 is a programmable logic device that performs all the instructions, logic, and mathematical processing performed in executing user applications (e.g., a client application 108). Storage 104 stores application programs and data for use by client computer systems 110 and 112. Typical storage devices 104 include hard-disk drives, flash memory devices, optical media and the like. Additionally, the processing activity and access to hardware resources made by client application 108 may be coordinated by an operating system (not shown). Well known examples of operating systems include the Windows® operating system, distributions of the Linux® operating system, and IBM's i5/OS® operating system, among others. (Linux is a trademark of Linus Torvalds in the US, other countries, or both). Network 115 represents any kind of data communications network, including both wired and wireless networks. Accordingly, network 115 is representative of both local and wide area networks, including the Internet.

Also as shown, memory 106 of client computer systems 110 and 112 includes a client application 108. In one embodiment, client application 108 is a software application that allows users to access documents stored by a content management system (CMS) 130. For example, client application 108 may be configured to allow users to create, edit, and save documents, e.g., word-processing documents, spreadsheets, database records, digital images or video data objects, to name but a few (collectively referred to as "documents") from CMS 130. In one embodiment, client application 108 may be configured to check-out a document 117 from CMS 130 and store it in storage 104 while it is edited by client application 108.

Illustratively, checked-out document $117_1$ includes fragments $119_1$ and $119_2$ and checked-out document $117_2$ includes fragments $119_3$ and $119_4$. In one embodiment, although presented to a user interacting with client application 108 as a single document, internally, CMS 130 may burst fragments 119 out of documents $117_1$ and $117_2$ when they are checked-in to CMS 130. Thus, each of fragments 119 may be independently available for use in many documents managed by CMS 130. Similarly, each fragment 119 may have its own ACL, lifecycle, synchronization rules, reconstitution rules, etc.

Server system 120 includes a CPU 122, CMS storage repository 124, and a memory 126 connected by a bus 121. CMS repository 124 may include a database 140 and file system 142. File system 142 typically provides access to a directory structure contained on a disk drive or network file system and may be used to store files (e.g., documents 141, document fragments 144, and configuration data managed by CMS 130). Database 140 may contain additional information and metadata related to documents stored in file system 142. Illustratively, database 140 includes fragmentation data 146 and reconstitution policies 148. Documents 141 and document fragments 144 represent the substantive content stored and managed by CMS 130. In one embodiment, CMS 130 uses fragmentation data 146 to manage what fragments have been burst from what documents.

Memory 126 of server system 120 includes CMS 130. CMS 130 provides an application program configured for creating, modifying, archiving, and removing content managed by CMS 130. Thus, CMS 130 may include tools used for publishing, format management, revision and/or access control, content indexing, and facilities for performing searches and other operations related to documents managed by CMS 130. As shown, CMS 130 includes a fragment reconstitution tool 124 and a document bursting tool 134. Those skilled in the art will recognize, however, that the components shown in FIG. 1 are simplified to highlight aspects of the present invention and that a typical CMS 130 may include a broad variety of additional tools and features used to manage a repository of shared content.

In one embodiment, document bursting tool 134 may be configured to burst portions of a document whenever it is checked-in or imported into CMS 130. For example, an XML document may include a document type declaration, or DOCTYPE, which associates that XML document with a Document Type Definition (DTD). Based on a given document type, the CMS 130 may be configured to inspect a document for certain elements, and if present, burst those elements into XML fragments managed by CMS 130 as their own independent document. Further, bursting tool 134 may be configured to associate a reconstitution policy 148 with each such document fragment. In one embodiment, the reconstitution policy 148 may specify criteria by which a given fragment should be "un-burst" or reinserted back into its original source document. Thus, when a fragment is burst out (making it eligible for re-use in many documents), and, subsequently, when it turns out that the fragment is not, in fact, reused, that fragment may be restored to the document from which it came. The fragment reconstitution tool 132 may be configured to periodically scan the document fragments 144 to identify ones which, according to a corresponding reconstitution policy 148, should be reinserted.

Figure 2:
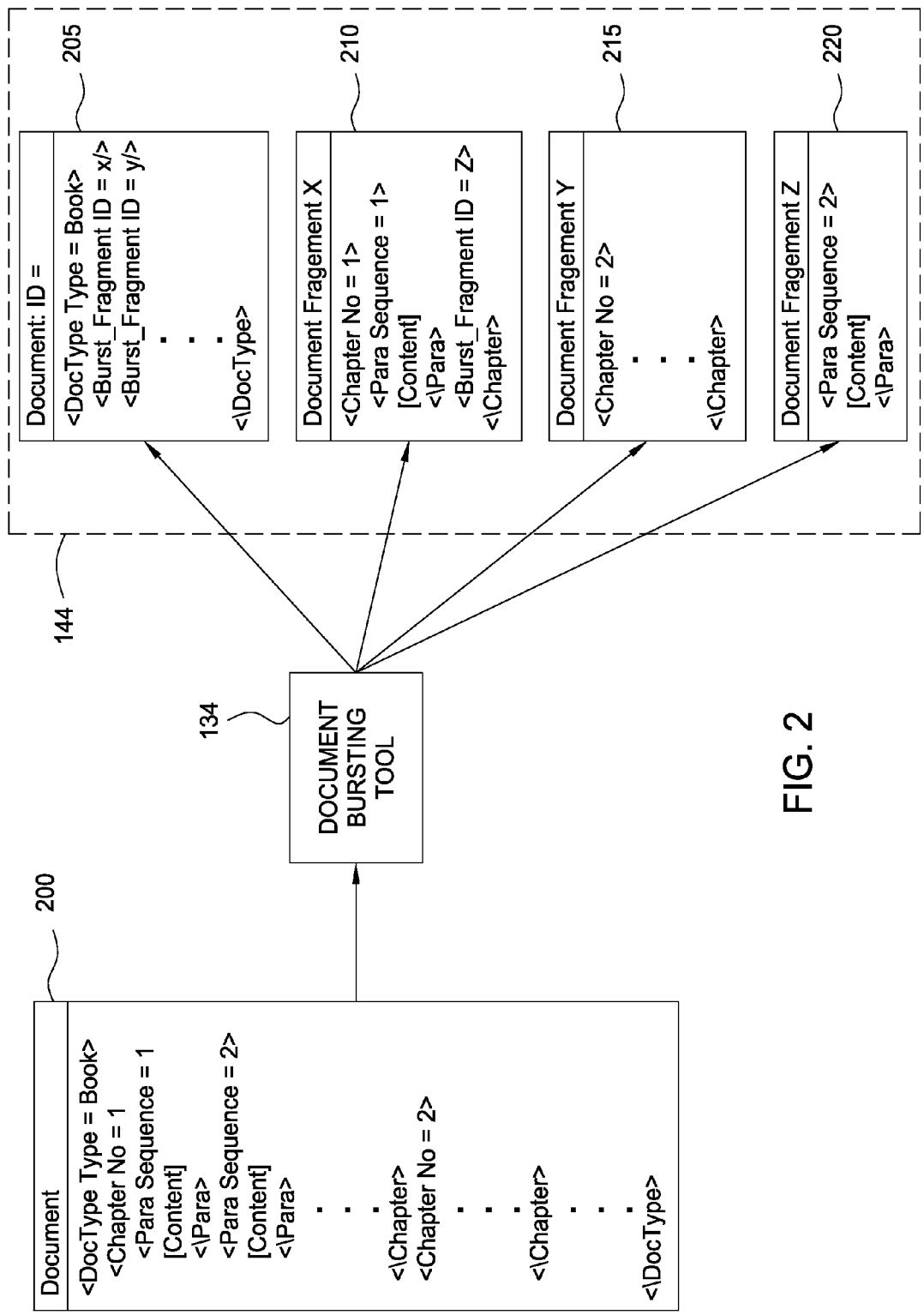
FIG. 2 is a conceptual illustration of an example document managed by a CMS being burst into multiple fragments, according to one embodiment of the invention.

FIG. 2 is a conceptual illustration of an example document 200 managed by a CMS being burst into multiple fragments, according to one embodiment of the invention. As shown, document 200 has a DOCTYPE of "book" and is marked up using an example set XML tags corresponding to typical elements of a book. In this example, the "book" DOCTYPE can contain one or more <chapter> elements, each having one or more <para> elements (representing a paragraph). Assume that the document 200 is checked-in to CMS 130 and processed by document bursting tool 134.

After processing the resulting document fragments, 210, 215, and 220 have been burst from document 200 (leaving a source document 205) and stored by CMS 130. Source document 205 corresponds to document 200, but fragments 210, 215, and 220 haven been burst from source document 205. Illustratively, the <chapter> elements have been burst from document 200 (leaving source document 205) and each replaced with a <burst_fragment> tag. Additionally, the <burst_fragment> tag includes an attribute "ID" referencing a CMS identifier assigned to the fragment burst from the document 200. In other words, the content of the two <chapter> elements have been burst from document 200 and replaced with a reference to these elements. Illustratively, the <burst_fragment> with an ID of "X" corresponds to the <chapter no=1> element of document 200, and the <burst_fragment> with an ID of "Y" corresponds to the <chapter no=2> element of document 200. Document fragments 210 and 215 correspond to these two <chapter> elements, respectively.

Further, document fragment 210 includes a <burst_fragment> with an ID of "Z" indicating that an element of fragment 210 has been burst from document 200. Specifically, the <para> element with an attribute of "sequence=2" has been burst from document 200 (leaving source document 205) and stored as fragment 220. Fragments 210, 215, and 220 may be reused in multiple documents managed by CMS 130. However, sometimes, a fragment may be burst from a document and not reused by others. In one embodiment, such fragments may eventually be reinserted back into their original source document. For example, if no document (apart from source document 205) ever references document fragment 215, then eventually, this fragment may be restored to source document 205, thereby creating at least partially reconstituted source document, reducing the storage and management overhead of CMS 130. In the event that all of the fragments 210, 215, and 220 are restored to source document 205, then source document 205 essentially becomes document 200 again, as though it had never been fragmented in the first place.

Figure 3:
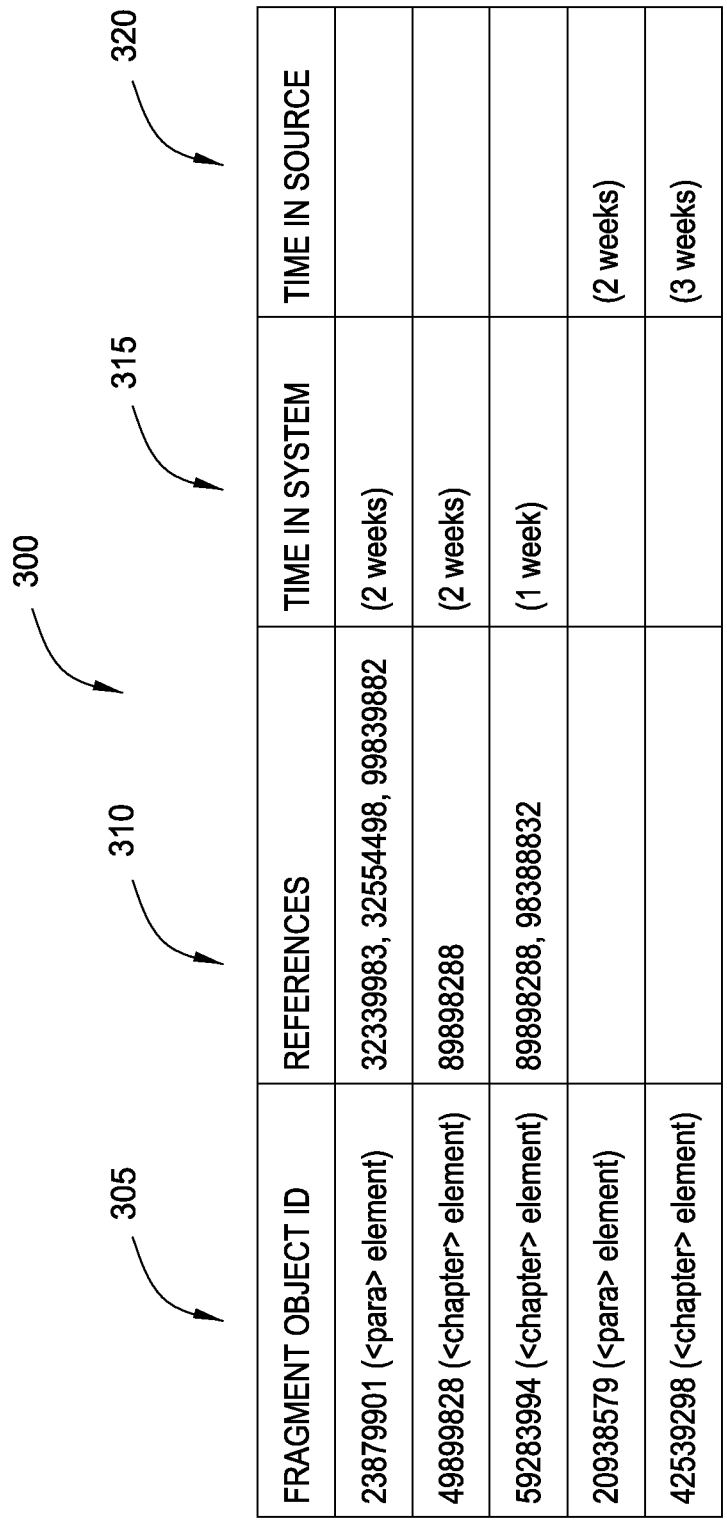
FIG. 3 illustrates an example of fragmentation data used by a CMS to reconstitute fragments into a source document, according to one embodiment of the invention.

FIG. 3 illustrates an example of fragmentation data 146 used by CMS 130 to reinsert fragments into a source document, according to one embodiment of the invention. As shown, a table 300 contains sample fragment data that may be updated by CMS 130 whenever a document fragment is added to or removed from other documents managed by CMS 130. In this case, the "Fragment object ID" column 305 identifies the fragment in the CMS by an object ID. The "References" column 310 indicates (by object ID) which other CMS documents reference that fragment. Thus, CMS documents represented by IDs 32339983, 32554498, and 99839882 each reference the <para> element with an ID of 23879901. In other words, fragment 23879901 is reused in three separate documents managed by CMS 130. When one of the documents in column 310 is checked-out, CMS 130 retrieves fragment 23979901 and restores it to the document being checked-out. Contrast this with the fragment represented by an ID of 49899828 (a <chapter> element), this fragment is only referenced by a single document. Thus, this fragment may be a candidate for reinsertion. That is, depending on the reconstitution policy applied to fragment 49899828, it may be eventually restored into document 89898288.

The "Time in System" column 315 indicates how long the XML fragment has been stored in the repository. In one embodiment, a reconstitution policy may specify how long a fragment needs to have existed within the CMS 130 before it is eligible for reinsertion. The "Time in Source" column 320 indicates how long the XML fragment has been "inline" within its original source document(s). That is, if the CMS reinserts a fragment back into its original source document(s), the "Time in Source" column 320 may be used to indicate how much time has elapsed since that fragment was reinserted.

FIGS. 4-5 illustrate examples of a fragment reconstitution policy 148 used by CMS 130 to manage document fragments 144, according to one embodiment of the invention. As shown, a table 400 stores sample reconstitution policy data. In one embodiment, a reconstitution policy 148 is bound to a document fragment when that fragment is ingested into CMS 130 (i.e. during a bursting operation). Each row of table 400 specifies a policy that may be bound to different document fragments. Illustratively, the "Policy Binding ID" column 405 identifies a policy object in the CMS by an object ID. In this example, table 400 includes reconstitution policies bound to document fragments from Table 300 of FIG. 3.

As shown, table 400 includes a "Time before Reinsertion" column 410, a "Minimum Reference Count" column 415, a "Minimum Peer Reuse" column 420 and a "Time before Rebursting" column 425. Each of these columns may specify conditions used to evaluate whether a document fragment should be restored to a corresponding source document. Of course, the conditions specified here are included as an example, and these, or other, conditions may be tailored to suit the needs of a particular case.

In one embodiment, the "Time before Reinsertion" column 410 indicates how long before a given fragment is available for reinsertion. That is, in one embodiment, once a fragment is burst from a document, CMS 130 may be configured to maintain that fragment for a certain minimum amount of time before it is eligible for reinsertion. Thus, the CMS may allow a given fragment to be available for reuse for some time period before it is considered for reinsertion. The "Minimum Reference Count" column 415 may be used to specify how many references must exist to prevent fragment reinsertion. That is, once the time before reinsertion period expires, a given fragment may be reinserted back into its source document(s) if it has fewer than the minimum number of references. A "Minimum Peer Reuse" column 420 may be used to indicate what percentage of peer fragments must be reused by other documents in order to prevent fragment reinsertion. This setting may be useful when a given class of fragments is heavily reused, even though a given instance of the class has been burst from a document, but not yet reused in multiple documents. For example, if a large number of <chapter> elements are ultimately reused, then the fact that a given <chapter> element has not yet been reused may not be a sufficient reason to reinsert that fragment. The "Time before Rebursting" column 425 may be used to specify a minimum amount of time that must elapse after a fragment has been reinserted before that fragment may again be burst from source.

The different conditions just described may be further illustrated using an example, assume that CMS 130 is configured to perform a weekly scan of the repository. Taking the data from Table 300 and Table 400, we observe the following:

Fragment 23879901 (a <para> element) is reinserted back into its source documents. This occurs because the fragment is bound to policy 1, which specifies that this fragment must be at least 1.5 weeks old (it is 2 weeks old), it must have less than 4 references (it has 3), and it does not require any peer usage. Since fragment 23879901 meets all of these criteria, the system reinserts this fragment back into objects 32339983, 32554498, and 99839882.

Fragment 49899828 (a <chapter> element) is not reinserted back into its source document. This occurs because the fragment is bound to policy 2, which specifies that the percentage of peer reuse must be less than 50% to allow reinsertion. Since there is one peer (fragment 5928399, another <chapter> element), and this peer element is referenced by more than one source document, the criteria for reinsertion is not met. (Note, other than minimum peer reuse, the other criteria for reinsertion were met for this fragment).

Fragment 59283994 (a <chapter> element) is not reinserted back into its source documents. This occurs because the fragment is bound to policy 2, which specifies that a fragment must be at least 1.5 weeks old (it is only 1 week old). Since at least one of the criteria is not met, CMS 130 does not reinsert this fragment back into the referencing objects.

Fragment 20938579 (a <para> element) is not marked eligible for rebursting. This occurs because policy 1 specifies that a fragment must have been "inline" within the source for at least 2.5 weeks. Since this fragment was only in the source for 2 weeks, CMS 130 does not mark fragment 20938579 eligible for bursting again.

Fragment 42539298 (a <chapter> element) is marked eligible for rebursting. This occurs because policy 2 specifies that a fragment must have been "inline" within the source for at least 2.5 weeks. Since this fragment was in the source for 3 weeks, CMS 130 marks it as eligible for bursting again.

Thus, as these examples illustrate, the conditions under which a given fragment is reinserted (or marked eligible for bursting) are highly flexile, and can be adapted to suit a variety of scenarios.

FIG. 5 illustrates a table 500 used to by CMS 130 to determine when to scan for unused fragments and how to handle them once detected. As shown, table 500 includes parameters specifying a scan frequency, a scan time, and a detection policy. Illustratively, the detection policy is set to "AUTOMATIC_REINSERTION" meaning that once a fragment is identified as meeting the criteria for reinsertion (based on a reconstitution policy) that fragment is automatically reinserted into the document from which that fragment was burst. Alternatively, the detection policy may specify a "notify" option. In such a case, the CMS 130 may be configured to identify fragments eligible for reinsertion and send a message to the documents' owner/author and/or the CMS administrator. In such a case, the relevant individual may have the opportunity to reinsert individual fragments into their host documents as they deem appropriate in a given case.

Figure 6:
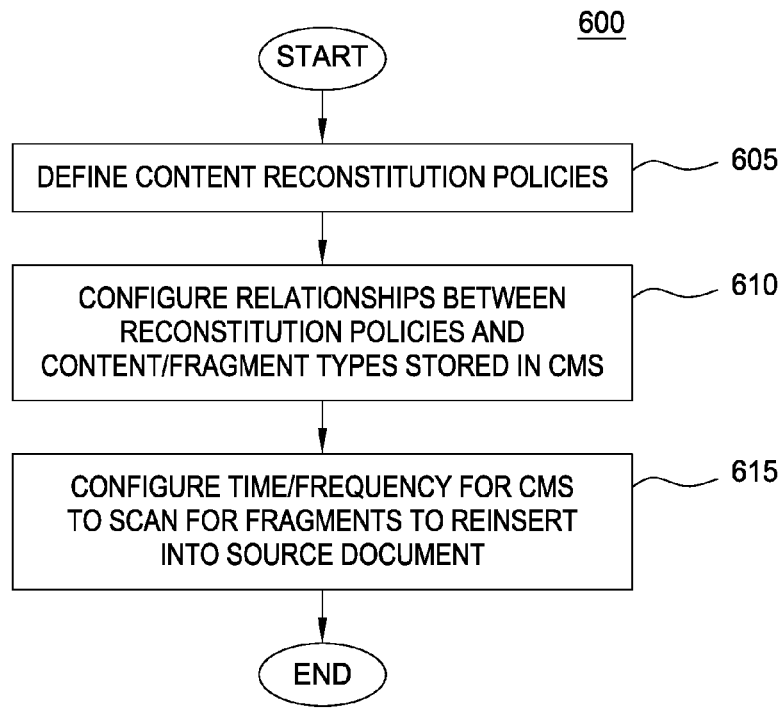
FIG. 6 illustrates a method for a system administrator to configure a CMS to selectively reconstitute document fragments back into a source document, according to one embodiment of the invention.

FIG. 6 illustrates a method 600 for a system administrator to configure a CMS to selectively reinsert document fragments back into a source document, according to one embodiment of the invention. As shown, method 600 begins at step 605, where the administrator defines content reconstitution policies to be applied to a repository of documents managed by CMS 130. For example, an administrator may create polices to specify a set of conditions under which a given fragment should be reconstituted into a source document. At step 610, the administrator may configure relationships between the reconstitution policies defined at step 605 and document fragments and document types stored in the CMS. At step 615, the administrator may configure the time and/or frequency at which the CMS 130 scans the document repository for fragments to reinsert into source documents.

Figure 7:
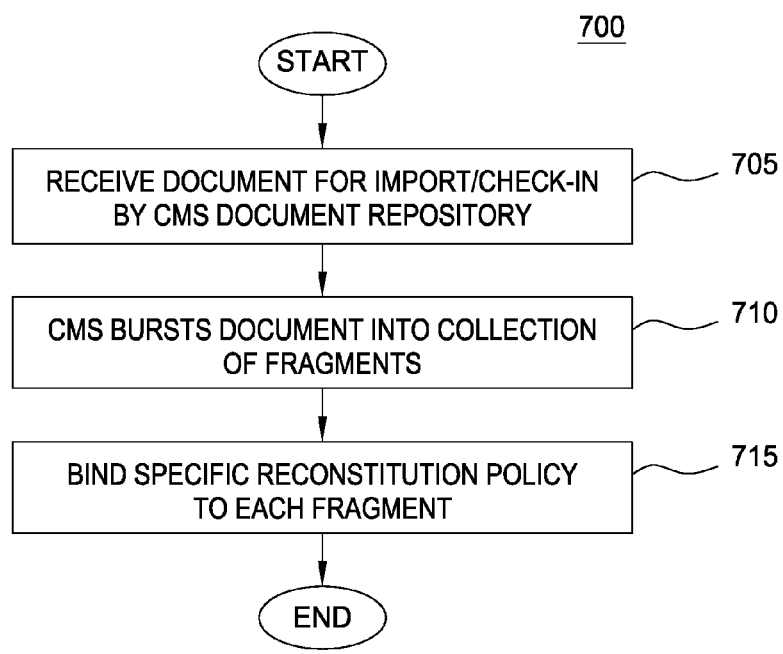
FIG. 7 is a flow chart illustrating a method for bursting portions of a document managed by a CMS, according to one embodiment of the invention.

FIG. 7 is a flow chart illustrating a method 700 for bursting portions of a document managed by a CMS, according to one embodiment of the invention. At step 705, CMS 130 receives a document to be checked-in (or imported). For example, FIG. 1 illustrates client application 108 being used to edit document $117_1$ (with fragments $119_1$ and $119_2$). When a user completes editing document $117_1$, it may be returned to CMS 130 for check-in. At step 710, CMS 130 may burst portions from the document being checked-in. For example, FIG. 2 illustrates three document fragments 210, 215, and 220 burst from an original source document 200. At step 715, the CMS 130 may bind a specific reconstitution policy to each fragment burst from the source document at step 710.

Figure 8:
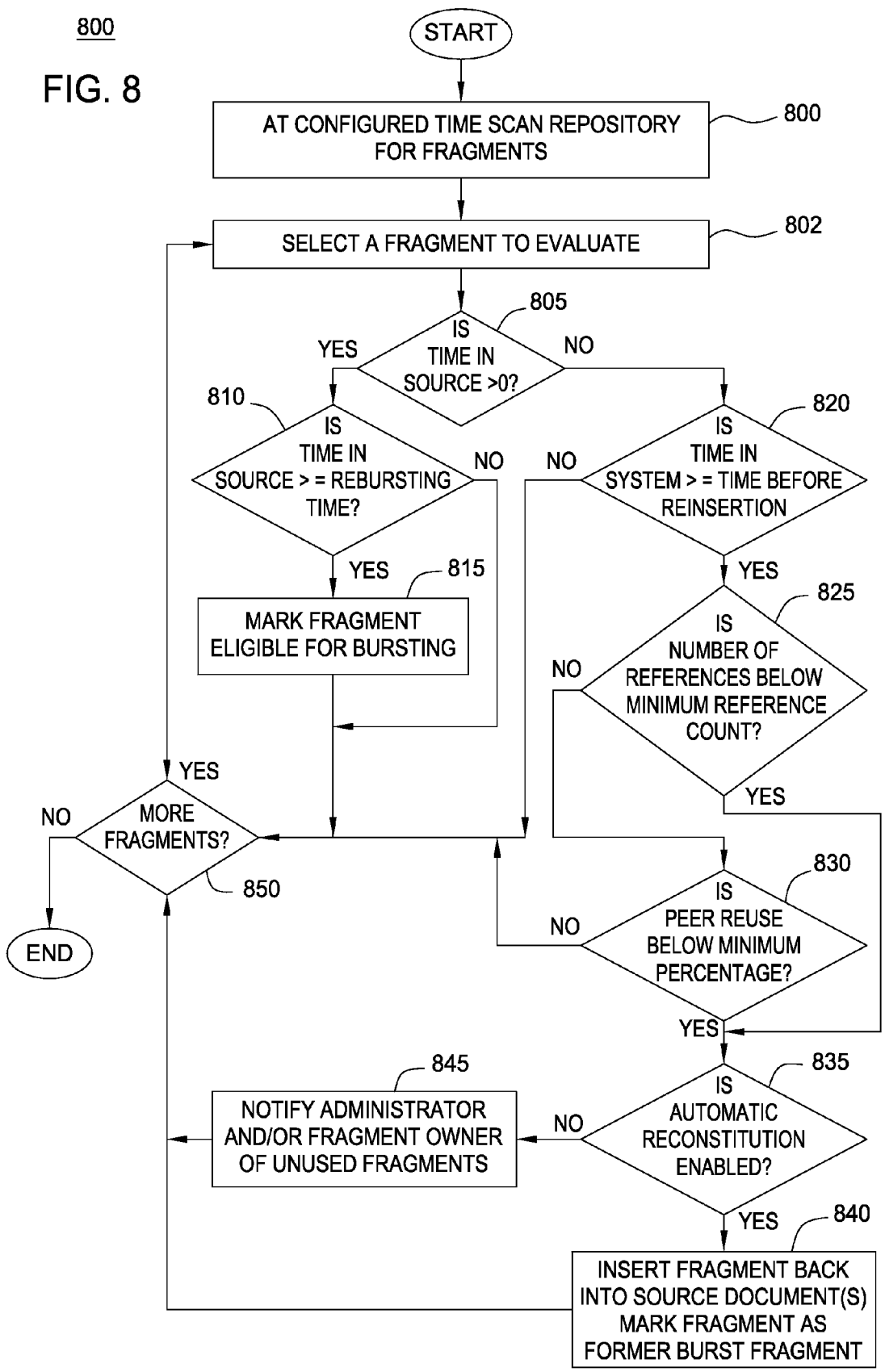
FIG. 8 is a flow chart illustrating a method for document fragment reconstitution, according to one embodiment of the invention.

FIG. 8 is a flow chart illustrating a method for document fragment reconstitution, according to one embodiment of the invention. As shown, method begins at step 800, where CMS 130 initiates a scan to evaluate document fragments stored in a CMS repository. For example, FIG. 5 illustrates a CMS configuration where a scan is performed weekly, on Mondays, at 12:00 AM. Once the scan begins, CMS 130 may identify a collection of document fragments to evaluate. At step 802, a loop begins to evaluate each fragment identified at step 800 to determine which fragments should be reinserted into their source documents.

At step 805, CMS 130 may determine whether the fragment has already been reinserted into a host document. For example, if the "time in source" value for the current fragment is greater than zero, then that fragment was previously reinserted into a source document. That is, the CMS may determine whether the fragment being evaluated is "inline" as part of a source document. If so, then at step 810, CMS 130 may determine whether the fragment has been "inline" for greater than a minimum period specified in a fragment reconstitution policy associated with that fragment. If so, then at step 815 the fragment is marked as being eligible to be burst from the source document. Method 800 then proceeds to step 850 where CMS 130 determines whether more fragments remain to be evaluated.

Returning to step 805, if the fragment currently being evaluated is not "inline," then at step 820, CMS 130 may determine whether the fragment has been burst from a source document and stored by CMS 130 for more than a minimum time period, as specified by a reconstitution policy associated with that fragment. If not, method 800 then proceeds to step 850 where CMS 130 determines whether more fragments remain to be evaluated. Otherwise, if the current fragment has been in the system longer than the minimum (step 820), then at step 825, CMS 130 may determine whether the fragment is referenced by a minimum number of documents, as specified by a reconstitution policy associated with that fragment. If the fragment is referenced by the minimum number of documents, then method 800 then proceeds to step 850 where CMS 130 determines whether more fragments remain to be evaluated.

Otherwise, at step 830, the CMS may determine whether the peer reuse percentage for the fragment being evaluated is below the minimum, as specified by a reconstitution policy associated with that fragment. If the peer reuse percentage is above the minimum, then method 800 then proceeds to step 850 where CMS 130 determines whether more fragments remain to be evaluated.

Collectively, at steps 820, 825, and 830, CMS 130 evaluates each of the conditions specified by a reconstitution policy associated with a fragment being evaluated. In this example, should CMS 130 determine that the fragment being evaluated does not satisfy any one of the conditions at steps 820, 825, or 830, then the fragment is reinserted back into the document from which it was burst. Of course, in other embodiments, the fragment may have to satisfy (or fail) some, or all, of the conditions specified in a reconstitution policy associated with that fragment in order for it to remain as an independent fragment in CMS 130.

In one embodiment, at step 835, where a fragment is to be reinserted into a source document, the CMS 130 may determine whether "automatic" reinsertion is enabled. If so, then at step 840, CMS 130 may reinsert the fragment back into the document from which it was burst, and potentially into other documents that referenced the fragment at the time of reinsertion. That is, the fragment may be reconstituted into a corresponding source document. Additionally, fragmentation data maintained by CMS 130 may be updated to reflect that the fragment was reinserted. Thereafter, the "inline" fragment may not be burst from the document for a minimum period, as specified by the reconstitution policy bound to that fragment. Alternatively, CMS 130 may be configured to notify a document owner or system administrator that a burst fragment is not being reused and should likely be restored into the document from which it was burst.

Advantageously, the performance of a CMS system configured for document bursting may be significantly improved by automatically scanning a CMS document repository for unused fragments and "cleaning up" the repository when certain conditions are met. Thus, embodiments of the invention may be used to automatically adjust the fragmentation present in a CMS by detecting and reinserting unused fragments back into their original documents.

While the foregoing is directed to embodiments of the present invention, other and further embodiments of the invention may be devised without departing from the basic scope thereof, and the scope thereof is determined by the claims that follow.

What is claimed is:

1. A computer-implemented method of fragment reconstitution in a content management system (CMS), comprising:
    scanning a plurality of document fragments stored by the CMS, wherein each of the plurality of document fragments was burst from a corresponding source document, and wherein each of the plurality of document fragments is associated with a reconstitution policy, wherein the reconstitution policy specifies criteria for determining whether to reinsert a given one of the plurality of document fragments back into the corresponding source document;
    reinserting at least one of the document fragments into the respective source document corresponding to the at least one document fragment, based on the respective reconstitution policy associated with the at least one document fragment, thereby producing an at least partially reconstituted source document; and
    storing the partially reconstituted source document on a computer readable medium.

2. The method of claim 1, wherein the reconstitution policy associated with the at least one document fragment specifies at least a minimum period of time that the at least one document fragment is stored in the CMS before being eligible for reinsertion.

3. The method of claim 1, wherein the at least one document fragment is reused by a plurality of corresponding source documents.

4. The method of claim 1, wherein the reconstitution policy associated with the at least one document fragment specifies at least a minimum number of source documents that reference the at least one document fragment in order to avoid reinsertion of the at least one source document fragment into the corresponding source document.

5. The method of claim 1, wherein the reconstitution policy associated with the at least one document fragment specifies at least a minimum peer document reuse percentage of the at least one document fragment in order to avoid reinsertion of the at least one source document fragment into the corresponding source document.

6. The method of claim 1, further comprising:
    receiving a new source document to be stored in the CMS;
    bursting, from the new source document, a first document fragment; and
    associating the first document fragment with a reconstitution policy.

7. The method of claim 1, further comprising, specifying a minimum time period for the reinserted document fragment into the source document, wherein the minimum time period before the reinserted document fragment is eligible to be burst from the source document.

8. The method of claim 1, further comprising, sending a message to notify a document owner that the at least one document fragment has been reinserted into the corresponding source document.

9. A computer-readable storage medium containing a program which, when executed, performs an operation for fragment reconstitution in a content management system (CMS), the operation comprising:
    scanning a plurality of document fragments stored by the CMS, wherein each of the plurality of document fragments was burst from a corresponding source document, and wherein each of the plurality of document fragments is associated with a reconstitution policy, wherein the reconstitution policy specifies criteria for determining whether to reinsert a given one of the plurality of document fragments back into the the corresponding source document; and
    reinserting at least one of the document fragments into the respective source document corresponding to the at least one document fragment, based on the respective reconstitution policy associated with the at least one document fragment, thereby producing an at least partially reconstituted source document; and
    storing the partially reconstituted source document on a computer readable medium.

10. The computer-readable storage medium of claim 9, wherein the reconstitution policy associated with the at least one document fragment specifies at least a minimum period of time that the at least one document fragment is stored in the CMS before being eligible for reinsertion.

11. The computer-readable storage medium of claim 9, wherein the at least one document fragment is reused by a plurality of corresponding source documents.

12. The computer-readable storage medium of claim 9, wherein the reconstitution policy associated with the at least one document fragment specifies at least a minimum number of source documents that reference the at least one document fragment in order to avoid reinsertion of the at least one source document fragment into the corresponding source document.

13. The computer-readable storage medium of claim 9, wherein the reconstitution policy associated with the at least one document fragment specifies at least a minimum peer document reuse percentage of the at least one document fragment in order to avoid reinsertion of the at least one source document fragment into the corresponding source document.

14. The computer-readable storage medium of claim 9, wherein the operation further comprises:
   receiving a new source document to be stored in the CMS;
   bursting, from the new source document, a first document fragment; and
   associating the first document fragment with a reconstitution policy.

15. The computer-readable storage medium of claim 9, wherein the operation further comprises, specifying a minimum time period for the reinserted document fragment into the source document, wherein the minimum time period before the reinserted document fragment is eligible to be burst from the source document.

16. The computer-readable storage medium of claim 9 wherein the operation further comprises, sending a message to notify a document owner that the at least one document fragment has been reinserted into the source document.

17. A system, comprising:
   a processor; and
   a memory containing a content management system (CMS) program which, when executed by the processor, for fragment reconstitution in the CMS, the operation comprising:
      scanning a plurality of document fragments stored by the CMS, wherein each of the plurality of document fragments was burst from a corresponding source document, and wherein each of the plurality of document fragments is associated with a reconstitution policy, wherein the reconstitution policy specifies criteria for determining whether to reinsert a given one of the plurality of document fragments back into the corresponding source document; and
      reinserting at least one of the document fragments into the respective source document corresponding to the at least one document fragment, based on the respective reconstitution policy associated with the at least one document fragment, thereby producing an at least partially reconstituted source document; and
      storing the partially reconstituted source document on a computer readable medium.

18. The system of claim 17, wherein the reconstitution policy associated with the at least one document fragment specifies at least a minimum period of time that the at least one document fragment is stored in the CMS before being eligible for reinsertion.

19. The system of claim 17, wherein the at least one document fragment is reused by a plurality of corresponding source documents.

20. The system of claim 17, wherein the reconstitution policy associated with the at least one document fragment specifies at least a minimum number of source documents that reference the at least one document fragment in order to avoid reinsertion of the at least one source document fragment into the corresponding source document.

21. The system of claim 17, wherein the reconstitution policy associated with the at least one document fragment specifies at least a minimum peer document reuse percentage of the at least one document fragment in order to avoid reinsertion of the at least one source document fragment into the corresponding source document.

22. The system of claim 17, wherein the operation further comprises:
   receiving a new source document to be stored in the CMS;
   bursting, from the new source document, a first document fragment; and
   associating the first document fragment with a reconstitution policy.

23. The system of claim 17, wherein the operation further comprises, specifying a minimum time period for the reinserted document fragment into the source document, wherein the minimum time period before the reinserted document fragment is eligible to be burst from the source document.

24. The system of claim 17, wherein the operation further comprises, sending a message to notify a document owner that the at least one document fragment has been reinserted into the source document.

* * * * *